J. d'HEUREUSE.
PROCESS FOR TREATING GRAIN.
No. 176,631. Patented April 25, 1876.
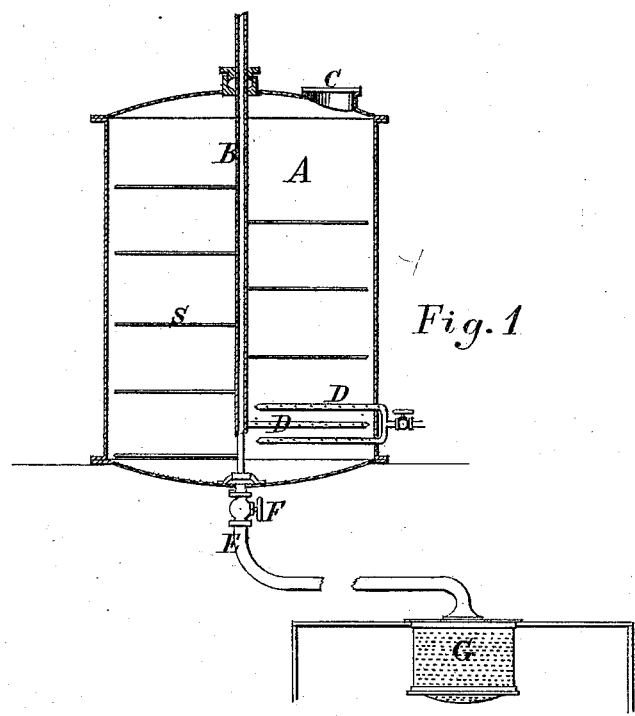
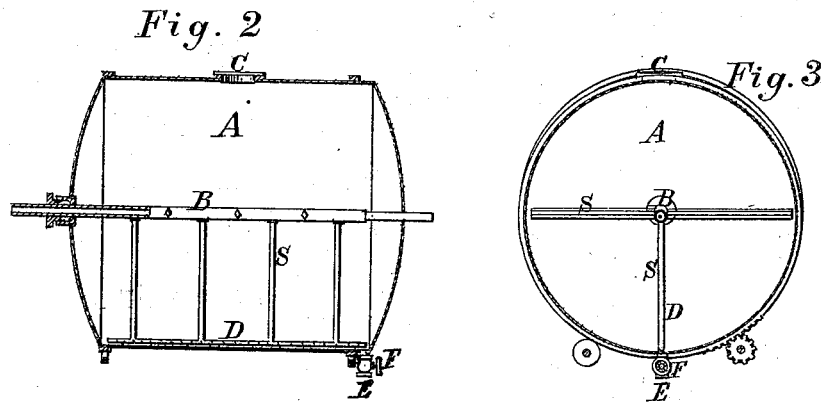
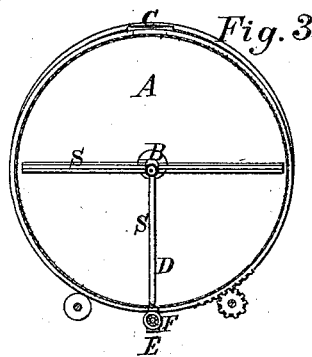

UNITED STATES PATENT OFFICE.

JULIUS D'HEUREUSE, OF SCHMETZDORF, NEAR BERNAU, PRUSSIA.

IMPROVEMENT IN PROCESSES FOR TREATING GRAIN.

Specification forming part of Letters Patent No. 176,631, dated April 25, 1876; application filed February 2, 1876.

*To all whom it may concern:*

Be it known that I, JULIUS D'HEUREUSE, of Schmetzdorf, in Prussia, Germany, have invented a new and useful Improvement in Treating and Mashing Corn and Grain, &c., which improvement is fully set forth in the following specification, reference being had to the accompanying drawing.

The object of my invention is to comminute or disintegrate the substance of corn, grain, or other products more perfectly and economically than by the present modes in use. The hulls or skins of corn, grain, or leguminous products being left intact by my process, they may be separated quickly and economically from the useful portion.

The first object is accomplished by subjecting the corn, grain, &c., entire, with water in a close vessel, by slow stirring, to the effect of steam under pressure, when, after some time, the substance of the corn, &c., will be found entirely disintegrated, forming a homogeneous soup or pasty mass. The hulls or skins, left intact, can now be readily removed from the disintegrated parts by blowing or forcing the mass through suitable screens or strainers, on which the hulls remain, while the rest passes through the meshes. This is done to best advantage directly from the tank in which the disintegration has taken place.

In the accompanying drawing like letters indicate like objects.

Figure 1 represents a sectional elevation of a vertical tank, suitable for the purpose; Figs. 2 and 3, an inclined or nearly horizontally acting tank, A, of suitable material, in which a shaft, B, provided with stirrers S, can revolve entirely, or execute a rocking, swinging, or to-and-fro motion. The shaft passes through one or more stuffing-boxes in the side or sides of the tank.

C is the charge or man hole. The pipe or pipes D supply the steam directly from without, or by way of the shaft B, which then is hollow, and has all or some hollow stirrers, suitably perforated or opened for the admission of steam. E is the discharge-pipe, with valve, gate, or faucet F; and G is the screen, sift, or strainer, suitably constructed.

The mode of operation is as follows: The tank is charged with the corn, grain, &c., previously cleaned or washed, if required, and the proper proportion of water, of which for distill-mash a quantity but little exceeding in weight that of the corn, &c., answers well; all openings are closed, the steam is turned on, and the stirrers are put in operation, which may be done by revolving or swinging the shaft B, or tank A. With a steam-pressure of about forty to fifty pounds per inch corn is disintegrated, a homogeneous mass produced within four to five hours, other products in more or less of that time, and the mass is then ready to be discharged into the mash-tun, if intended for distillation, brewing, or kindred purposes. There the addition of the malt at the proper temperature converts quickly and completely all starch into glucose, considerably more of which is formed than by the ordinary modes in use of mashing corn or grain ground in a mill. The conversion of the starch is also accomplished much quicker, doing away with a great deal of onerous labor, careful attention, and considerable risk, upon which the satisfactory yield of spirits to a large degree depends. The reason for a more complete and quick production of glucose must be found in the fact that by my process the disintegration of all particles is more complete by far than by mill-ground corn or grain, and that thus every particle of the mass is brought, and immediately, into contact with the acting diastase; as a consequence, a richer wort is drawn, or more alcohol produced, from the same quantity of corn or grain than by the ordinary mode, and of a quality not inferior.

The disintegration may be also effected under a pressure not that, or not only that, of live steam, but by the assistance of impelled air; the pressure can thus be raised and maintained at the required point without increasing that of the steam. The air is forced into and enters the tank below or above the surface of its contents, even at or near the bottom of the tank, and by the same or a different pipe by which the steam, if any, is admitted. In this case steam at low pressure may serve for heating the substances under treatment in the water to the required temperature, which, for instance, for malt should, or for other substances and certain purposes might, even remain considerably below, 212° Fahrenheit. By this mode malt for brewing could be disintegrated and its substance extracted quicker and more completely than by the expensive mash-tuns now in use. The grains or cereals treated by this invention may be whole, broken, or ground.

Peas, beans, and other leguminous products are reduced to a pasty consistency more quickly and completely in the manner explained than by the ordinary mode of boiling in open kettles.

The homogeneous mass produced as above described from corn, grain, &c., if blown through suitable screens or strainers G, is freed from all hard, gritty matter pertaining to the hulls or skins, which are retained by the strainers, through which only the finely-disintegrated parts are allowed to pass. By attaching the strainer or strainers to the discharge-pipe E, this object is accomplished most conveniently and economically, while the mass is blown or discharged from the disintegrator, though it may be done as a subsequent operation—for instance, by centrifugal strainers. A mass is thus obtained at a trifling cost, without the use of mills or other expensive machinery and labor, which contains all of the valuable portion of corn, grain, or other products, and free from the grit due to the hulls or skins, which is an unpleasant component of the present corn-meal. The mass in this condition is ready for immediate consumption as an article of food, and constitutes a basis of numerous articles of diet. It may be dried in any suitable manner in form of cakes, sheets, strings, in granular or other form, and in such condition can be kept for any length of time, ready for immediate consumption. Salt, condiments, or other substances may be added while in the tank, and thus thoroughly incorporated and mixed with the mass, or they may be added subsequently.

Immense quantities of corn, now comparatively worthless in certain sections of the country, can, in the manner described, be converted into a very desirable article of commerce cheaply, commanding a much enhanced price, and in every respect superior to corn-meal. The same to some extent applies to grain, peas, beans, &c.

What I claim is—

1. The process herein described for reducing grains, seeds, and similar products to a pulpy mass, consisting in treating the entire grain or seeds, whole or broken, in a close vessel by high-pressure steam or by steam or heat and air-pressure, substantially as described.

2. The process of preparing pulp or paste from cereals, grains, and seeds, consisting in steaming so as to loosen the pulp from the hull, and then forcing the mass against a sieve or filter so as to separate the hard from the soft portions, as set forth.

3. The process of treating grains and seeds, such as described, consisting of the following operations, viz: steaming so as to soften the pulp, then separating the hard portions, and finally drying the mass, substantially in the manner described.

JULIUS D'HEUREUSE.

Witnesses:
 CARL THIEME,
 HERMANN KOSORO.